United States Patent [19]

Aksamit

[11] 4,440,045
[45] Apr. 3, 1984

[54] CHAIN SAW SHARPENER

[76] Inventor: Frank J. Aksamit, 12605 Blackberry Row, Bayonet Point, Fla. 33567

[21] Appl. No.: 383,751

[22] Filed: Jun. 1, 1982

[51] Int. Cl.³ .................................... B23D 63/16
[52] U.S. Cl. ................................ 76/25 A; 76/36; 76/37; 51/268
[58] Field of Search ................ 76/25 A, 37, 41, 36, 76/74, 40; 51/268

[56] References Cited

U.S. PATENT DOCUMENTS

| | | | |
|---|---|---|---|
| 2,568,062 | 9/1951 | Fitch | 76/41 |
| 2,643,553 | 6/1953 | Evanoff | 76/37 |
| 2,729,987 | 1/1956 | Bluemink | 76/37 |
| 2,805,587 | 9/1957 | Goehle | 76/41 |
| 2,833,166 | 5/1958 | Wilson et al. | 76/41 |
| 3,013,448 | 12/1961 | Deck . | |
| 3,015,239 | 1/1962 | Just | 76/36 |
| 3,126,021 | 3/1964 | May | 51/268 |
| 3,172,306 | 3/1965 | Kephart, Jr. . | |
| 3,364,796 | 1/1968 | Steibel | 76/40 |
| 3,738,200 | 6/1973 | Granberg . | |
| 3,827,185 | 8/1974 | Smith . | |
| 3,905,118 | 9/1975 | Ballew | 76/36 |
| 4,002,089 | 1/1977 | Granberg . | |
| 4,019,407 | 4/1977 | Penberthy . | |
| 4,104,793 | 8/1978 | Simington . | |
| 4,120,215 | 10/1978 | Kaye | 76/25 A |
| 4,173,908 | 11/1979 | Aksamit | 76/25 A |

*Primary Examiner*—Roscoe V. Parker
*Attorney, Agent, or Firm*—Lawrence A. Cox

[57] ABSTRACT

A chain saw sharpener, having a fixture comprising a generally inverted U-shaped frame and a sharpening tool guide attached to a support bracket extending from the frame, which sharpening tool guide receives and guides a sharpening tool for use in sharpening the cutting links of a chain saw and is movable and may be set for sharpening of the cutting links at any angle specified by the chain saw manufacturer. The sharpening tool is a rotatable mandrel with a grinding stone at one end and structure at the opposite end for attachment to any suitable driving apparatus. A plastic shield protects the operator from being struck by metal fillings that are generated during the sharpening operation. A filing gauge attached to the frame indicates the height to which the depth gauges of the cutting links should be filed and incorporates stops to protect the cutting edges of the cutting links against contact with the file during such filing operation.

22 Claims, 8 Drawing Figures

CHAIN SAW SHARPENER

SUMMARY OF THE INVENTION

The disclosed invention is a chain saw sharpener.

A primary object of the invention is to provide a chain saw sharpener fixture for guiding a sharpening tool, which fixture is easy to use and is adjustable to permit sharpening of chain saw cutting links at the various angles specified by the manufacturers of the chain saws.

A further object of this invention is to provide a chain saw sharpener that is safer than previously-disclosed devices in that the rotating shaft of the sharpening tool is fully enclosed for failure containment and a transparent shield is fastened to the fixture to guard against injury to the operator from metal filings thrown off by the sharpening tool.

A still further object of this invention is to provide a chain saw sharpener fixture that has a frame of generally inverted U-shape with an integral sharpening tool guide support bracket, which frame is easily and inexpensively fabricated by injection molding or casting processes.

A still further object of this invention is to provide a chain saw sharpener fixture that can be fabricated easily and inexpensively from a multiplicity of materials whereby components having surfaces that are exposed to heavy wear can be fabricated of wear-resistant material and parts not having such surfaces can be fabricated of less expensive and less durable material.

A still further object of this invention is to provide a chain saw sharpener fixture in which the portions of the sharpener that are exposed to heavy wear can be detached and replaced with new parts, without having to replace the remainder of the device.

A still further object of this invention is to provide a chain saw sharpener for use with a hand-held electric drill, in which the operator can use the sharpener conveniently while holding the drill exclusively either in the operator's right hand or in the operator's left hand, whichever the operator prefers.

A still further object of this invention is to provide a chain saw sharpener in which the frame rests on the tops of the first and third cutting links of any three-link segment of the chain while the operator sharpens the middle cutting link of such three-link segment, thus providing a stable support for the sharpening tool.

A still further object of this invention is to provide a chain saw sharpener in which the sharpening tool guide serves as a stop to prevent a rotating sharpening tool from being completely withdrawn from contact with the cutting link being sharpened, thus preventing potentially dangerous and destructive bumping of the cutting link with the sharpening tool upon reestablishing contact with the cutting link, as seen in prior art chain saw sharpeners.

Other features and objects of the invention will be obvious and will be more fully described below.

DRAWINGS

DETAILED DESCRIPTION OF THE INVENTION

Figure 1:
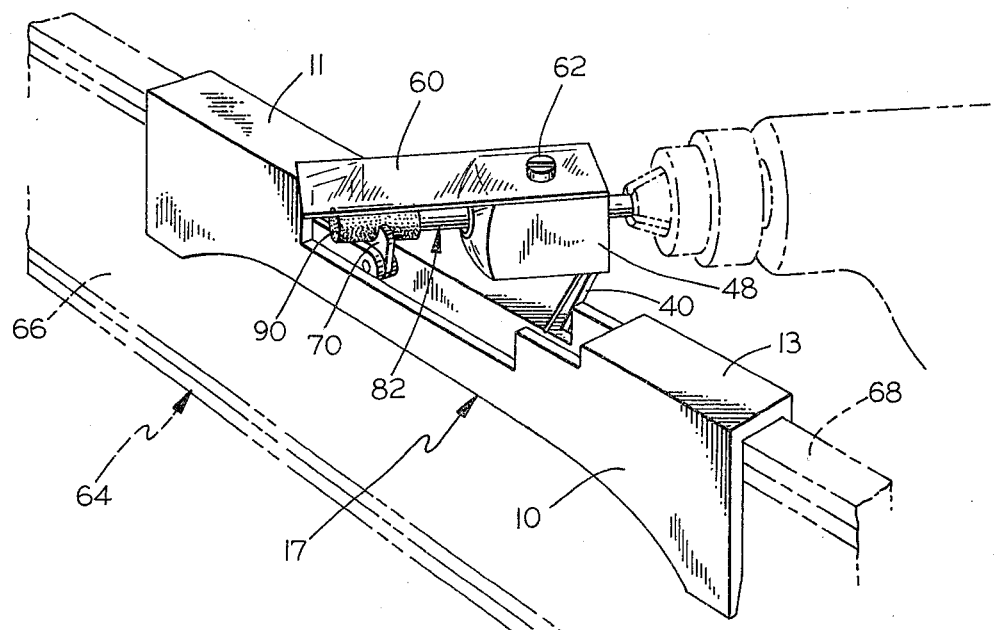
FIG. 1 is a perspective view of the invention mounted on the cutter bar of a chain saw, showing a grinding tool in the cutting position.
Figure 3:
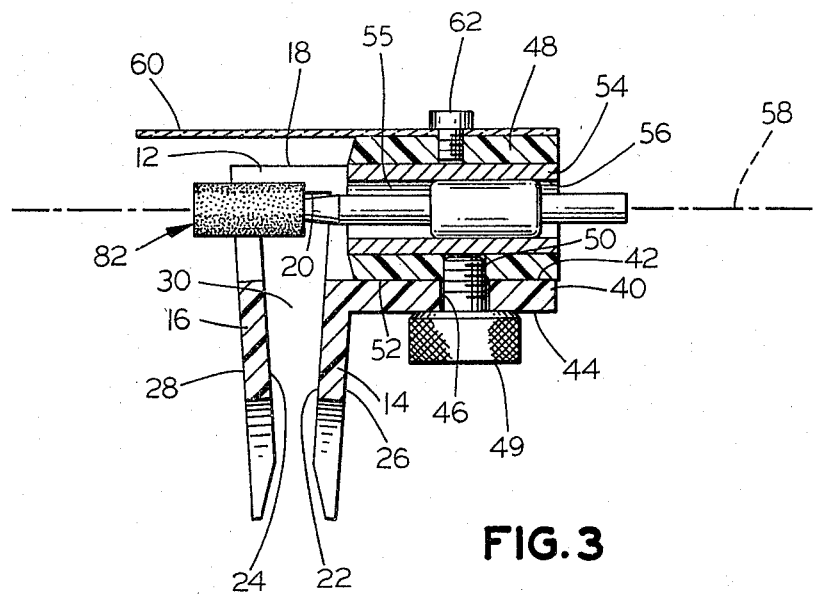
FIG. 3 is a section along line 3—3 as shown in FIG. 2.

The invention is shown in FIG. 1. It includes a fixture 17 and a sharpening tool 82. The fixture comprises a frame 10, being of a generally inverted U-shaped cross-section and having, as shown in FIG. 3, a web 12 and sidewalls 14 and 16 depending from opposite sides of web 12. Web 12 has a front web portion 11 and a rear web portion 13 and an upper surface 18 and a lower surface 20. Sidewalls 14 and 16 have inner surfaces 22 and 24 and outer surfaces 26 and 28, respectively. The inner surfaces 22 and 24 of the sidewalls and the lower surface 20 of the web cooperate to define a channel 30.

Figure 2:
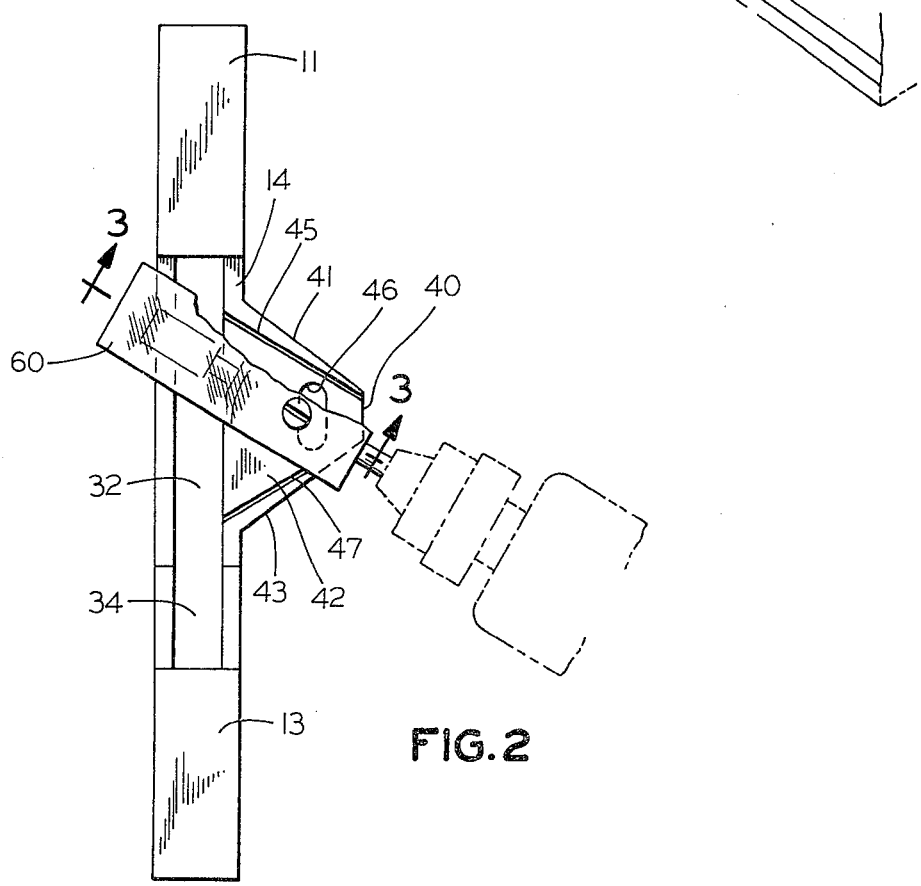
FIG. 2 is a top view of the invention as shown in FIG. 1, with a portion of the sharpening tool guide fixture cut away to show the upper surface of the support bracket.

As shown in FIG. 2, a sharpening opening 32 and a depth gauge opening 34 are disposed in web 12 and communicate with channel 30. A support bracket 40 is appended to sidewall 14 and extends laterally therefrom. The support bracket 40 can be appended to either sidewall, but it is appended to sidewall 14 in the preferred embodiment. The support bracket has an elongated hole 46 disposed therein.

Support bracket 40 may be of any convenient shape, but the preferred embodiment incorporates a support bracket 40 having sides 41 and 43 tapered into sidewall 14 at interior angles of 35°. In addition, in the preferred embodiment, upper surface 42 of support bracket 40 is marked with alignment lines 45 and 47 making interior angles of 30° with sidewall 14. These benchmarks can be used by the operator to align the sharpening tool guide for sharpening left-or right-facing cutting links at 30° or 35° angles, as described more fully below.

Figure 6:
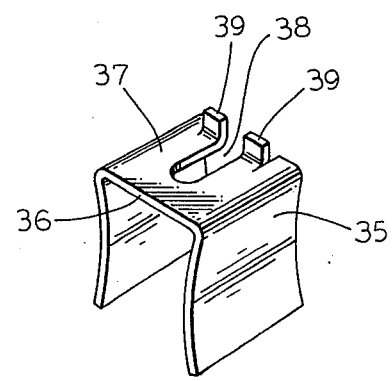
FIG. 6 is a perspective view of the filing gauge.

A filing gauge 35, shown in detail in FIG. 6, straddles the frame 10 in the area of depth gauge opening 34. The filing gauge has a generally inverted U-shaped cross-section, including web 36 having top surface 37. A slot 38 is disposed in web 36 at one end, and two stops 39 are located in the web adjacent to the open end of the slot 38.

As seen in detail in FIG. 3, support bracket 40 has flat upper and lower surfaces, 42 and 44, respectively. Sharpening tool guide 48 is attached to the support bracket by means of a thumb screw 49 inserted through hole 46 and threaded into tapped hole 50 in sharpening tool guide 48. Guide 48 may be pivoted about thumb screw 49 and aligned laterally within elongated hole 46 for adjustment to any desired cutting angle. Although hole 46 is elongated in the preferred embodiment, other embodiments of the invention could incorporate one or more round holes or holes of other shapes.

Figure 7:
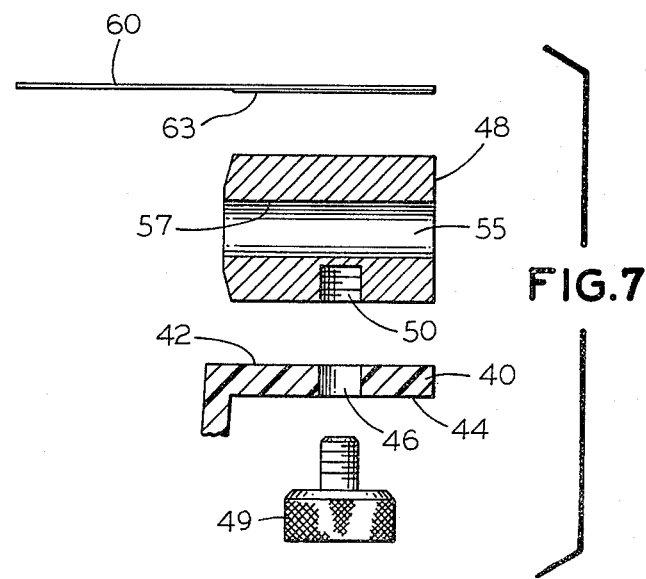
FIG. 7 is an exploded, cross-sectional view of the support bracket and sharpening tool guide, showing means of attaching the guide to the support bracket and the transparent shield to the guide fixture.

A guide bushing 54 is disposed in sharpening tool guide 48. The guide bushing has a transverse hole 55 therein, having an inner surface 56 and a centerline 58. In the preferred embodiment, guide bushing 54 is made of a suitable wear-resistant material, such as metal, and the remainder of sharpening tool guide 48 is made of any suitable, less expensive material, such as plastic. This construction permits the replacement of the relatively inexpensive guide bushing when it has worn out, without having to replace the entire sharpening tool guide. However, in another embodiment shown in FIG. 7, the sharpening tool guide 48 is fabricated in one piece and has a transverse hole 55 with an inner surface 57 identical to inner surface 56.

Sharpening tool guide 48 is shown in FIG. 1 as having a substantially square cross section. However, it can be of any shape, provided that such shape incorporates a means for maintaining the axis of transverse hole 55 parallel to the upper surface 42 of support bracket 40.

FIG. 1 also shows a typical chain saw 64, having a cutter bar 66 and a saw chain 68 mounted on the cutter bar. Saw chain 68 incorporates a series of cutting links 70.

Figure 4:
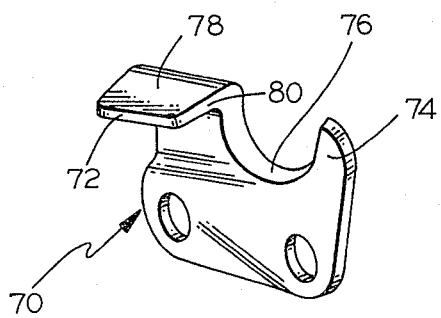
FIG. 4 is a perspective view of a cutting link of a chain saw.

A typical cutting link 70 is shown in FIG. 4. Each link has a tooth portion 72 and a depth gauge portion 74, connected by a gullet 76. The tooth portion has an upper surface 78 and a cutting edge 80. The cutting edge tapers rearwardly at an angle specified by the manufacturer. This angle usually is 30° or 35°. For optimum performance, the cutting edges should be sharpened and maintained at the angle specified by the manufacturer of the chain saw. The great advantage of the disclosed invention is that it can be adjusted for sharpening at any angle specified by the manufacturer.

The cutting links 70 are mounted on saw chain 68. In a typical saw chain, the links are approximately 1.25 inches apart on the chain and alternate facing left and right. In the preferred embodiment of the invention, the front web portion 11 and rear web portion 13 of web 12 are greater than 1.25 inches long, thus ensuring that both portions of web 12 will rest on at least one cutting link at all times, causing the frame to remain steady during the sharpening operation.

Figure 5:
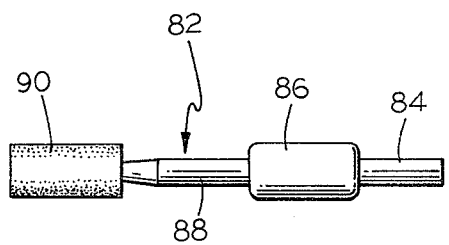
FIG. 5 is a side view of a grinding mandrel.

In the preferred embodiment, the sharpening operation is performed by a mandrel 82, shown in more detail in FIG. 5. The mandrel comprises a root 84 extending rearwardly from a bearing section 86, and a shaft 88 extending forwardly from bearing section 86, and a grinding stone 90 attached to shaft 88. The root, bearing section, shaft and grinding stone are aligned coaxially. The bearing section 86 is of slightly smaller diameter than transverse hole 55. Mandrel 82 is made of any suitable wear-resistant material, such as metal, because bearing section 86 will be in surface-to-surface contact with inner surface 56 of transverse hole 55.

As shown in FIG. 2, the invention also incorporates a transparent shield 60, which is attached to sharpening too guide 48 and extends over the cutting link that is being sharpened to prevent metal filings from striking the operator. The shield is made of any suitable transparent, shatterproof material, such as plastic, and may be attached to the sharpening tool guide by any suitable means, including, without limitation, thumbscrew 62, shown in FIG. 3, or any suitable bonding means 63, indicated in FIG. 7.

To use the invention, the fixture is positioned with the frame straddling the cutter bar, as shown in FIG. 1. Lower surface 20 of web 12 rests on the upper surfaces 78 of the first and third cutting links of any three - link segment.

Sharpening tool guide 48 is then attached loosely to support bracket 40, and mandrel 82 is inserted, root first, through transverse hole 55. Grinding stone 90 is lined up with cutting edge 80 of the link that is to be sharpened, and thumb screw 49 is tightened to secure sharpening tool guide 48 at the proper angle. If the manufacturer has specified that the cutting links should be tapered at 30° or 35° angles, the sharpening tool guide can be set at the proper angle by aligning the edge of the guide either with edge 41 or edge 43 of support bracket 40 (for a 35° angle) or with alignment lines 45 or 47, which are marked on support bracket 40 (for a 30° angle).

The lower surface 20 of web 12, the upper surface 42 of support bracket 40, the lower surface 52 of sharpening tool guide 48, the inner surface 56 of transverse hole 55, and the outer surface of bearing section 86 of mandrel 82 are disposed in vertical relation to each other in such a manner that grinding stone 90 is disposed vertically in the proper position for sharpening the cutting link 70.

Root 84 of mandrel 82 is then inserted into the chuck portion of a standard ¼-inch or ⅜-inch electric drill, and the chuck is tightened. The cutting edge of the link is then sharpened by using the drill to rotate the grinding stone and by moving the stone transversely across the cuting edge of the cutting link.

The lengths of bearing section 86 and of shaft 88 cooperate with the location of sharpening tool guide 48 so that even if mandrel 82 is moved inwardly during the sharpening operation to the point where the chuck portion of the electric drill makes contact with sharpening tool guide 48, the grinding stone 90 will remain in contact with the cutting link. This feature eliminates the problem encountered in prior art inventions in which the grinding stone can be pushed past the edge of the cutting link and the cuting link can be bumped by the grinding stone when contact is reestablished. This bumping action encountered in previous inventions is potentially hazardous to the operator and destructive to the cutting link.

During the grinding operation, the frame 10 may be held in place on the cutter bar by hand, or by thumb screws, or by any other holding devices, such as the resilient clamping pads disclosed in U.S. Pat. Ser. No. 4,173,908 to Aksamit. In the preferred embodiment, however, the sidewalls 14 and 16 taper inwardly, as shown in FIG. 3, to create a clamping action when fitted over the cutter bar.

After sharpening the cutting edge of the cutting link, the frame is moved along the cutter bar so that the link that was just sharpened is disposed in depth gauge opening 34. Filing gauge 35 is then placed over the frame 10, with slot 38 opening toward grinding opening 32, so that the depth gauge portion 74 of the cutting link extends through slot 38. The top surface 37 of filing gauge 35 is disposed vertically with respect to the lower surface 20 of web 12 in such a manner that the depth gauge portion, to be of the proper length after sharpening of the cutting edge, must be flush with top surface 37. Thus, using any suitable file, depth gauge portion 74 is then filed flush with top surface 37 of filing gauge 35. During the filing operation, stops 39 prevent the operator from inadvertently filing the cutting edge of the cutting link.

In the same manner, the operator sharpens every other cutting link on the chain facing in the same direction and files the depth gauge portions of those cutting links. The process is then repeated for all cutting links facing in the opposite direction, with the sharpening tool guide being adjusted to the angle of the opposite-facing cutting edges.

In the embodiment shown in FIG. 1, the support bracket 40 extends to the right of the operator, as viewed looking toward the motor housing of the chain saw from the end of the cutter bar. This position is convenient for a right-handed person, because the drill used to rotate the mandrel can be held in the operator's right hand. If the operator is left-handed, the direction of the frame can be reversed, so that the support bracket 40 extends to the left of the operator, thus enabling the operator to hold the drill in his left hand.

Figure 8:
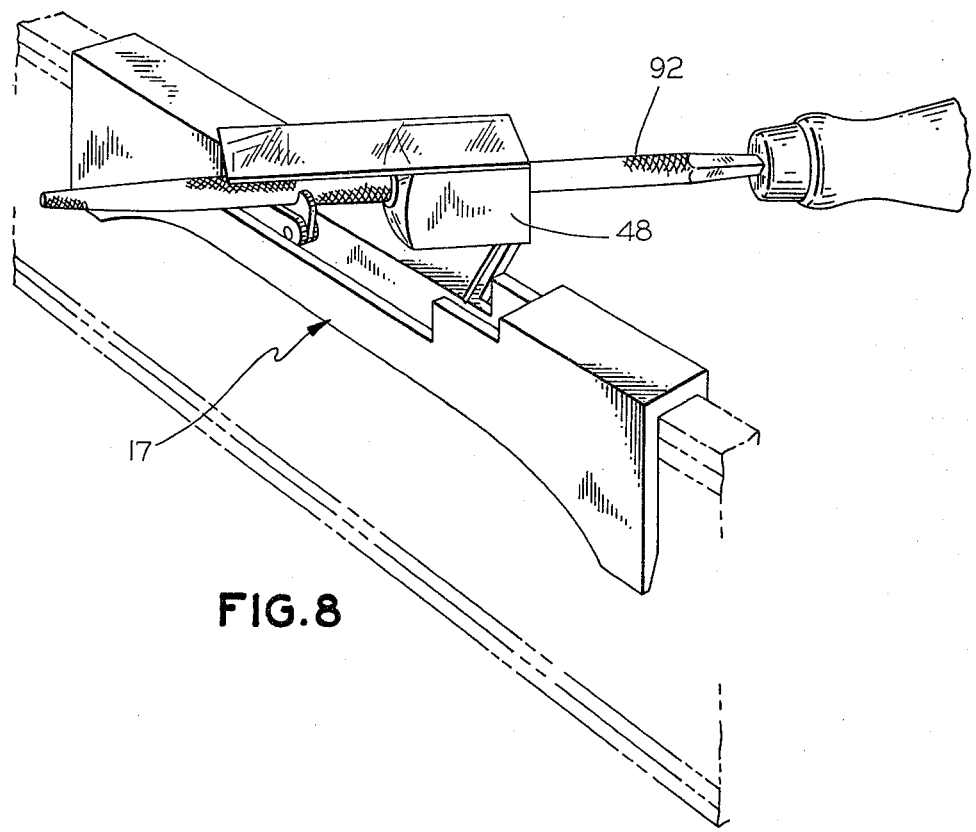
FIG. 8 is a perspective view of the invention showing use of a hand file as the sharpening tool.

Another embodiment of the invention is shown in FIG. 8. In this embodiment, a suitable hand-held file, such as rattail file 92, is used in place of grinding mandrel 82. The use of the invention is in all respects the same as described above, except that the file 92 is drawn across the cutting edges of each cutting link by hand. In this embodiment, the inner surface 56 of guide bushing 54 is fabricated of a wear-resistant material suitable for resisting the abrasive action of the file.

I claim:

1. A chain saw sharpener fixture comprising:
    a. A frame of substantially inverted U-shaped cross section defining a channel for receiving the cutter bar of a chain saw and comprising:
        (1) a web having a front web portion and a rear web portion, both having a lower surface and further having a sharpening opening and a depth gauge opening disposed therein between said front and rear web portions and communicating with said channel; and
        (2) two sidewalls depending from opposite sides of said web and structurally connecting said front and rear web portions;
    b. A support bracket extending laterally from one of said sidewalls having an elongated hole disposed therein, with the axis of said elongated hole lying parallel to said sidewall, and further having:
        (1) a flat, horizontal upper surface having front and rear edges tapering toward each other as distance from said sidewall increases and forming interior angles of 35° with said sidewall; and
        (2) front and rear lines marked on said upper surface, adjacent to said front and rear edges, respectively, tapering toward each other as distance from said sidewall increases and forming interior angles of 30° with said sidewall;
    c. A means for guiding a sharpening tool, comprising a body having a flat lower surface with parallel front and rear edges and a transverse hole extending horizontally through said body, the axis of said transverse hole being parallel to said front and rear edges of said lower surface, which guide means is supported by said support bracket and is positionable thereon with said front edge of said lower surface aligned with either said front edge of said support bracket or said front line marked on said support bracket or with said rear edge of said lower surface aligned with either said rear edge of said support bracket or said rear line marked on said support bracket; and
    d. Means inserted through said hole in said support bracket for attaching said guide means to said support bracket in said multiplicity of positions.

2. A chain saw sharpener fixture as described in claim 1, further comprising a filing gauge means for indicating the proper height of the depth gauges of the cutting links of said chain saw, for shielding said depth gauges from filing below said proper height, and for shielding the cutting edges of said cutting links from damage during the process of filing said depth gauges, which filing gauge means is mounted on said frame at said depth gauge opening.

3. A chain saw sharpener fixture as described in claim 2, in which said filing gauge means comprises:
    a. a web having a hole therein for receiving the depth gauge of a cutting link of a chain saw and a flat, horizontal upper surface;
    b. two sidewalls depending from opposite sides of said web and cooperating therewith to form a channel for receiving said frame in the area of said depth gauge opening; and
    c. stop means extending upwardly from said web and situated between said hole and the cutting edge of a link of a chain saw when the depth gauge of said chain saw link is disposed in said hole;

which filing gauge means straddles said frame at said depth gauge opening and is supported thereby, so that the vertical distance between the upper surface of the web of said filing gauge and the lower surface of the web of said frame is equal to the recommended vertical distance between the upper surface of the tooth of a chain saw cutting link and the top of the depth gauge of said cutting link.

4. A chain saw sharpener fixture as described in claim 3 further comprising a transparent shield attached to said guide means and adapted to be disposed above said sharpening tool at said sharpening opening in said frame.

5. A chain saw sharpener fixture as described in claim 4, in which the lengths of said front and rear portions of said web are greater than the distance between the cutting links of a chain saw.

6. A chain saw sharpener fixture as described in claim 5 in which said front and rear web portions of said frame are at least 1.25 inches long.

7. A chain saw sharpener fixture as described in claim 6 in which said body of said guide means comprises:
    a. An outer body; and
    b. An inner body disposed within said outer body, which inner body has said transverse hole disposed therein.

8. A chain saw sharpener fixture as described in claim 7 in which said outer body of said guide means has a tapped hole extending vertically thereinto from said lower surface thereof and said attachment means comprises an externally threaded member having a head on one end, which member is inserted through said hole in said support bracket and is threaded into said tapped hole in said body of said guide means until tightness is achieved.

9. A chain saw sharpener fixture as described in claim 8, in which said sidewalls of said frame taper toward each other as distance from said web increases, so that a clamping effect is achieved when said channel receives the cutter bar of a chain saw.

10. A chain saw sharpener fixture comprising:
    a. A frame having a substantially inverted U-shaped cross section defining a channel for receiving the cutter bar of a chain saw and comprising:
        (1) a web having:
            (i) a front web portion having a lower surface;
            (ii) a rear web portion having a lower surface; and (iii) a sharpening opening and a depth gauge opening disposed in said web between said front and rear web portions and communicating with said channel; and (2) two sidewalls depending from opposite sides of said web and structurally connecting said front and rear web portions;

b. A support bracket extending laterally from one of said sidewalls having an elongated hole disposed therein, with the axis of said elongated hole lying parallel to said sidewall, and further having:

(1) a flat, horizontal upper surface having front and rear edges tapering toward each other as distance from said sidewall increases and forming interior angles of 35° with said sidewall; and (2) front and rear lines marked on said upper surface, adjacent to said front and rear edges, respectively, tapering toward each other as distance from said sidewall increases and forming interior angles of 30° with said sidewall;

c. Means for guiding a sharpening tool comprising:

(1) An outer body having a flat lower surface with parallel front and rear edges; and (2) A replaceable inner body inserted in, supported by, and removeable from, said outer body and having a transverse hole disposed therein, the axis of which is parallel to said front and rear edges of said lower surface of said outer body, which outer body is supported by said support bracket and is positionable thereon with said front edge of said lower surface aligned with either said front edge of said support bracket or said front line marked on said support bracket or with said rear edge of said lower surface aligned with either said rear edge of said support bracket or said rear line marked on said support bracket; and d. Means inserted through said hole in said support bracket for attaching said guide means to said support bracket in said multiplicity of positions.

11. A chain saw sharpener fixture as described in claim 10, further comprising a filing gauge comprising:

a. a web having a hole therein for receiving the depth gauge of a cutting link of a chain saw and a flat, horizontal upper surface;

b. two sidewalls depending from opposite sides of said web and cooperating therewith to form a channel for receiving said frame in the area of said depth gauge opening; and c. stop means extending upwardly from said web and situated between said hole and the cutting edge of a link of a chain saw when the depth gauge of said chain saw link is disposed in said hole;

which filing gauge means straddles said frame at said depth gauge opening and is supported thereby, so that the vertical distance between the upper surface of the web of said filing gauge and the lower surface of the web of said frame is equal to the recommended vertical distance between the upper surface of the tooth of a chain saw cutting link and the top of the depth gauge of said cutting link.

12. A chain saw sharpener fixture as described in claim 11 further comprising a transparent shield attached to said guide means and adapted to be disposed above said sharpening tool at said sharpening opening in said frame.

13. A chain saw sharpener fixture as described in claim 12 in which said front and rear portions of said frame are at least 1.25 inches long.

14. A chain saw sharpener comprising:

a. A fixture comprising:

(1) A frame having a substantially inverted U-shaped cross-section defining a channel for receiving the cutter bar of a chain saw, which frame comprises:

(i) a web having:

(A) a front web portion having a lower surface;

(B) a rear web portion having a lower surface; and (C) a sharpening opening and a depth gauge opening disposed in said web between said front and rear web portions and communicating with said channel; and (ii) two sidewalls depending from opposite sides of said web and structurally connecting said front and rear web portions;

(2) A support bracket extending laterally from one of said sidewalls and having an elongated hole disposed therein, with the axis of said elongated hole lying parallel to said sidewall, and further having:

(i) a flat, horizontal upper surface having front and rear edges tapering toward each other as distance from said sidewall increases and forming interior angels of 35° with said sidewall; and (ii) front and rear lines marked on said upper surface, adjacent to said front and rear edges, respectively, tapering toward each other as distance from said sidewall increases and forming interior angles of 30° with said sidewall;

(3) A means for guiding a sharpening tool, comprising a body having a flat lower surface with parallel front and rear edges and a transverse hole extending horizontally through said body, the axis of said transverse hole being parallel to said front and rear edges of said lower surface, which guide means is supported by said support bracket and is positionable thereon with said front edge of said lower surface aligned with either said front edge of said support bracket or said front line marked on said support bracket or with said rear edge of said lower surface aligned with either said rear edge of said support bracket or said rear line marked on said support bracket;

(4) Means inserted through said hole in said support bracket for attaching said guide means to said support bracket in said multiplicity of positions; and (5) Filing gauge means for indicating the proper height of the depth gauges of said chain saw cutting links, for shielding said depth gauges from filing below said proper height, and for shielding the cutting edges of said cutting links from damage during the process of filing said depth gauges; and b. Means for sharpening the cutting links of said chain saw, which sharpening means is inserted through said transverse hole in said guide means and is guided by said guide means so that said sharpening means is directed into contact with the cutting edge of a cutting link of said chain saw.

15. A chain saw sharpener as described in claim 14, wherein said sharpening means comprises:

a. A rotatable mandrel comprising:

(1) a grinding stone disposed vertically above said sharpening opening in said frame;

(2) a shaft extending from, and coaxial with, said grinding stone;

(3) a cylindrical bearing member extending from, and coaxial with, said shaft, which bearing member is guided by the inner surface of said transverse hole; and (4) a root extending from, and coaxial with, said bearing member; and b. Means attachable to said root for rotating said mandrel.

16. A chain saw sharpener as described in claim 15, in which said filing gauge means comprises:

a. a web having a hole therein for receiving the depth gauge of a cutting link of a chain saw and a flat, horizontal upper surface;

b. two sidewalls depending from opposite sides of said web and cooperating therewith to form a channel for receiving said frame in the area of said depth gauge opening; and c. stop means extending upwardly from said web and situated between said hole and the cutting edge of a link of a chain saw when the depth gauge of said chain saw link is disposed in said hole;

which filing gauge means straddles said frame at said depth gauge opening and is supported thereby, so that the vertical distance between the upper surface of the web of said filing gauge and the lower surface of the web of said frame is equal to the recommended vertical distance between the upper surface of the tooth of a chain saw cutting link and the top of the depth gauge of said cutting link.

17. A chain saw sharpener as described in claim 16 wherein the lengths of said front and rear portions of said web are greater than the distance between the cutting links of a chain saw.

18. A chain saw sharpener as described in claim 17 wherein said front and rear portions of said web are at least 1.25 inches long.

19. A chain saw sharpener as described in claim 18 wherein said means for rotating said mandrel is an electric drill.

20. A chain saw sharpener as described in claim 19 in which the distance measured along the axis of said mandrel from the chuck of said electric drill to the point on said grinding stone lying closest to said chuck is shorter than the distance measured along the direction of the axis of said transverse hole from the point on said axis of said transverse hole lying farthest from said frame to the point on the cutting edge of said tooth of said chain saw lying farthest from said point on the axis of said transverse hole when said tooth is in position for sharpening with said mandrel.

21. A chain saw sharpener as described in claim 20, further comprising a transparent shield attached to said guide means and adapted to be disposed above said grinding stone at said sharpening opening in said frame.

22. A chain saw sharpener as described in claim 21 wherein said guide means comprises:

a. An outer body having a flat lower surface with parallel front and rear edges; and b. A replaceable inner body inserted in, supported by, and removable from, said outer body and having a transverse hole disposed therein, the axis of which is parallel to said front and rear edges of said lower surface of said outer body;

which outer body is supported by said support bracket and is positionable thereon with said front edge of said lower surface aligned with either said front edge of said support bracket or said front line marked on said support bracket or with said rear edge of said lower surface aligned with either said rear edge of said support bracket or said rear line marked on said support bracket.

* * * * *